(12) United States Patent
Wild et al.

(10) Patent No.: US 6,352,065 B1
(45) Date of Patent: Mar. 5, 2002

(54) METHOD AND DEVICE FOR DETERMINING THE GAS INTAKE IN AN INTERNAL COMBUSTION ENGINE

(75) Inventors: Ernst Wild, Oberriexingen; Lutz Reuschenbach, Stuttgart; Nikolaus Benninger, Vaihingen; Hendrik Koerner, Meckenheim; Werner Hess, Stuttgart; Hong Zhang, Regensburg; Georg Mallebrein, Singen; Harald Von Hofmann, Lehre, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,725
(22) PCT Filed: Sep. 2, 1998
(86) PCT No.: PCT/DE98/02572
§ 371 Date: Jun. 23, 2000
§ 102(e) Date: Jun. 23, 2000
(87) PCT Pub. No.: WO99/14476
PCT Pub. Date: Mar. 25, 1999

(30) Foreign Application Priority Data

Sep. 17, 1997 (DE) .......................................... 197 40 919

(51) Int. Cl.⁷ .......................... F02D 41/18; F02M 25/07
(52) U.S. Cl. ................. 123/494; 123/568.21; 73/118.2; 701/108
(58) Field of Search ...................... 123/568.21–568.27, 123/494; 701/102–104, 108; 73/118.2

(56) References Cited

U.S. PATENT DOCUMENTS

| | | |
|---|---|---|
| 5,205,260 A | 4/1993 | Takahashi et al. |
| 5,273,019 A | 12/1993 | Dudek et al. |
| 5,349,933 A * | 9/1994 | Hasegawa et al. ........... 123/486 |
| 5,941,927 A | 8/1999 | Pfitz |

FOREIGN PATENT DOCUMENTS

| | | |
|---|---|---|
| DE | 32 38 190 | 4/1984 |
| DE | 197 40 914 | 10/1998 |
| DE | 197 40 915 | 10/1998 |
| DE | 197 40 916 | 10/1998 |
| DE | 197 40 917 | 10/1998 |
| DE | 197 40 918 | 10/1998 |
| DE | 197 40 969 | 10/1998 |
| DE | 197 40 970 | 10/1998 |
| DE | 197 56 619 | 10/1998 |
| DE | 197 56 919 | 10/1998 |
| EP | 0 752 523 | 1/1997 |
| WO | 97 35106 | 9/1997 |
| WO | 98/44250 | 10/1998 |
| WO | 99/14475 | 3/1999 |
| WO | 99/14476 | 3/1999 |

* cited by examiner

Primary Examiner—Henry C. Yuen
Assistant Examiner—Arnold Castro
(74) Attorney, Agent, or Firm—Kenyon & Kenyon

(57) ABSTRACT

A method for determining a gas charge of an internal combustion engine having an intake manifold. The intake manifold has a gas mixture, which is a fresh air/fuel mixture and an exhaust gas, and further has a gas mass flow from the intake manifold and an intake manifold pressure. The method includes the steps of determining a partial pressure of the fresh air/fuel mixture in the gas mass flow by setting up a mass balance for a fresh air/fuel mixture mass flow, determining a partial pressure of the exhaust gas in the gas mass flow by setting up a mass balance for an exhaust gas mass flow, and determining a gas mass flow via a throttle based on a function that depends on a temperature compensation factor, a pressure compensation factor and a factor depending on a ratio of a pressure downstream of the throttle to a pressure upstream of the throttle. The pressure downstream of the throttle corresponds to the intake manifold pressure.

11 Claims, 6 Drawing Sheets

METHOD AND DEVICE FOR DETERMINING THE GAS INTAKE IN AN INTERNAL COMBUSTION ENGINE

FIELD OF THE INVENTION

The present invention relates to a method and a device for determining a gas charge of an internal combustion engine. The invention is applicable in particular to the field of automotive engineering, for example, in an internal combustion engine in a passenger car.

BACKGROUND INFORMATION

Customary internal combustion engines have an intake manifold in which a gas mixture made up of a fresh air/fuel mixture and an exhaust gas is located. During the operation of the internal combustion engine, this gas mixture is drawn into the cylinder volume of the internal combustion engine and subsequently compressed and burned. The volume of the gas flowing into the cylinder, in particular the fresh air/fuel mixture component of this volume, must be determined to meter the quantity of fuel to be made available for combustion.

German Patent No. 32 38 190 concerns an electronic system to control or regulate the operating characteristics of an internal combustion engine. In doing so, the pressure in the intake manifold is determined based on speed and air throughput in the intake manifold and/or the air throughput is determined based on speed and pressure.

German Paten Application No. 1 97 13 379 concerns a device for determining the air entering the cylinders of an internal combustion engine having a supercharger. This system also takes into account the physical circumstances additionally occurring due to the supercharging. In particular, the physical events occurring in the intake manifold of an internal combustion engine with a supercharger can be readily detected by including physical and fluid engineering relationships.

At least some methods and devices treat the gas mixture present in the intake manifold uniformly with regard to the determination of the gas charge of the internal combustion engine. In particular, no distinction is made between a fresh air/fuel mixture component and an exhaust gas component in the gas mixture. As a result of this, the determined gas charge volumes contain errors. The non-linear relationship between the measured quantities and the target variable of charge per stroke as well as the influence of exhaust gas recirculation are corrected directly in an empirical manner. Such a correction is only precise in a steady-state condition. Moreover, the variable relationship between the gas charge and the intake manifold pressure such as occurs, for example, with active tank ventilation or cam adjustment is not taken into account.

SUMMARY OF THE INVENTION

An object of the invention is therefore to provide a method and a device for determining a gas charge of an internal combustion engine which overcomes the disadvantages described above. In particular, the object may be achieved by determining the fresh air/fuel mixture component in the charged gas volume. Moreover, the invention should be very flexible with regard to the input variables used. In addition, the method according to the invention should be robust and reliable in operation and the associated device should be economical to produce, operate and maintain invention are described in the sub-claims.

A listing of the abbreviations used in the following description can be found at the end of the description.

The aforementioned objects may be achieved by a method for determining a gas charge of an internal combustion engine having an intake manifold, a gas mixture made up of a fresh air/fuel mixture and an exhaust gas being present in the intake manifold, a gas mass flow mp_ab flowing out of the intake manifold and an intake manifold pressure (ps) being present in the intake manifold, including by the steps: determining of a partial pressure of fresh air/fuel mixture component ps_fg in gas mass flow mp_ab by setting up a mass balance for a fresh air/fuel mixture mass flow mp_fg and determining of a partial pressure of exhaust gas component ps_ag in gas mass flow mp_ab by setting up a mass balance for an exhaust gas mass flow mp_ag. In setting up the mass balance, the time derivation of the general gas equation $$m \times R \times T = p \times V$$

is to be understood in particular. Accordingly, the mass balance for the fresh air/fuel mixture component is as follows:

$$\mathrm{mp\_fg} = \mathrm{mp\_fg\_zu} - \mathrm{mp\_fg\_ab} = \frac{d}{dt}(\mathrm{m\_fg})$$

$$= \frac{d}{dt}\left(\mathrm{ps\_fg} \times VS \times \frac{1}{R \times TS}\right)$$

Correspondingly, the following applies to the mass balance for the exhaust gas component:

$$\mathrm{mp\_ag} = \mathrm{mp\_ag\_zu} - \mathrm{mp\_ag\_ab} = \frac{d}{dt}(\mathrm{m\_ag})$$

$$= \frac{d}{dt}\left(\mathrm{ps\_ag} \times VS \times \frac{1}{R \times TS}\right)$$

This separate balancing of fresh air/fuel mixture and exhaust gas offers the advantage that the charged fresh air/fuel mixture volume can be calculated precisely. This advantageously makes an exact and reliable determination of the quantity of fuel to be supplied possible. It makes environmentally acceptable and energy-saving operation of the internal combustion engine possible. As a result, the operating costs of the internal combustion engine are reduced and its life expectancy is increased. Moreover, it is advantageous that a precise determination of the quantity of fuel to be supplied is made possible even with various configurations of the internal combustion engine, for example, with or without exhaust gas recirculation, with or without supercharging, etc.

In an exemplary particular embodiment of the invention, the method calculates intake manifold pressure ps from the sum of the partial pressure of fresh air/fuel mixture component ps_fg and of the partial pressure of exhaust gas component ps_ag. This calculation is made via the addition:

$$Ps = Ps\_fg + ps\_ag$$

This calculation of intake manifold pressure ps offers the advantage that a possibly additionally measured value for the intake manifold pressure can be checked using the calculated value. Moreover, it is an advantage that the intake manifold pressure can be determined in this manner without the additional expense of a pressure measuring sensor. In addition, it is advantageous that the intake manifold pressure can be determined in this manner even in the event of failure of an existing pressure measuring sensor.

An exemplary embodiment of the invention determines intake manifold pressure ps using a corresponding measuring sensor. Any commercially available pressure measuring sensors may be used as measuring sensors, wire strain gauges, diaphragm pressure sensors or resonant pressure sensors, in particular. The pressure may be determined directly or indirectly via an intermediate medium. The signal supplied by the pressure measuring sensor may be additionally processed by appropriate circuitry; for example, a temperature compensation or an offset balancing may be provided. The determination of intake manifold pressure ps using a measuring sensor offers the advantage that intake manifold pressure ps can be determined very precisely with it. Moreover, it is an advantage that the intake manifold pressure calculated via the partial pressures can be checked and corrected if necessary and the calculation can be calibrated via the measured intake manifold pressure.

An exemplary embodiment of the invention determines gas mass flow mp_ab from the intake manifold pressure. This determination is made with the consideration of speed n of the internal combustion engine as well as a camshaft adjustment NWS that may be present in the internal combustion engine from which a correction value p_iagr of the internal exhaust gas recirculation is taken into account. In particular, this makes it possible to determine gas mass flow mp_ab flowing out of the intake manifold according to the equation:

$$mp\_ab=(ps-p\_iagr)\times K.$$

The value K in this connection is a calculation constant in which the pump equation is included and possible pulsation effects that were determined empirically are included. The advantage of this calculation of the gas mass flow mp_ab is that it is possible even without the provision of a measured intake manifold pressure, solely on the basis of the calculated partial pressures. This makes an economical and reliable implementation of the method according to the invention possible.

In an exemplary embodiment of the invention, fresh air/fuel mixture component mp_fg_ab in gas mass flow mp_ab flowing out of the intake manifold is calculated using the partial pressure of fresh air/fuel mixture component ps_fg, the partial pressure of exhaust gas component ps_ag and gas mass flow mp_ab. For this purpose, a proportional factor c_agr is initially introduced which is calculated as follows:

$$c\_agr = \frac{ps\_ag}{ps\_ag + ps\_fg}$$

In order to determine the fresh air/fuel mixture component in this mass flow, it is assumed that the distribution of the mass flows into the cylinder (fresh air/fuel mixture and exhaust gas) takes place by analogy to the distribution of the partial pressures. Accordingly, fresh air/fuel mass flow mp_fg_ab flowing out of the intake manifold is calculated as:

$$mp\_fg\_ab=(1-c\_agr)\times mp\_ab$$

Correspondingly, the following applies to exhaust gas mass flow mp_ag_ab flowing out of the intake manifold:

$$mp\_ag\_ab=(1-c\_agr)\times mp\_ab$$

It is advantageous that as a result of this simple and reliable calculation, it is possible to determine both the fresh air/fuel mixture component as well as the exhaust gas component in the gas mass flow flowing out of the intake manifold. The separate detection of the fresh air/fuel mixture and exhaust gas component makes environmentally acceptable and energy-saving operation of the internal combustion engine possible in its particular optimum operating point.

In an exemplary embodiment of the invention, relative fresh air/fuel mixture charge rl of the internal combustion engine is calculated using fresh air/fuel mixture component mp_fg_ab as well as permanent MLTHZ and transient nmot, ZYLZA engine data. The advantage of the calculation of relative fresh air/fuel mixture charge rl is that the fuel can always be supplied based on current engine data, for example, based on the number of active cylinders of the engine in operation at the moment. This further increases the effect of fuel economy and environmental compatibility during operation of the internal combustion engine as well as further improves its life expectancy and performance.

In an exemplary embodiment of the invention, a function derived from the Bernoulli equation is used for the calculation of a gas mass flow via a throttle, the pressure downstream of the throttle always corresponding to intake manifold pressure ps. This has the advantage that optionally some of the measured quantities that are suitable in principle can be used and the variables that are not available in each case can be calculated via this derived function. This allows for great flexibility of the method according to an exemplary embodiment of the invention both in the implementation of the method in the form of a device as well as during the operation of such a method. In addition, this flexibility of the configuration also increases the operational reliability of the method according to an exemplary embodiment of the invention.

In an exemplary embodiment of the invention, gas flows via an idle actuator mp_lls, gas flows via a fuel-tank venting valve mp_tev, gas flows via an exhaust gas recirculation valve mp_agr and also charge-air pressure pld in a supercharged internal combustion engine are also taken into consideration in determinating the gas charge of the internal combustion engine. The advantage of this is that the precision of the determined fresh air/fuel mixture charge of the internal combustion engine is further increased and consequently the aforementioned advantages are increased.

A exemplary embodiment of the present invention also includes a device for determining a gas charge of an internal combustion engine having an intake manifold, the device having measuring sensors and an electronic means of computation which calculates a partial pressure of a fresh air/fuel mixture component ps_fg in the intake manifold by setting up a mass balance for a fresh air/fuel mixture mass flow mp_fg, calculates a partial pressure of an exhaust gas component ps_ab in the intake manifold by setting up a mass balance for an exhaust gas mass flow mp_ab and determines a fresh air/fuel mixture charge rl of the internal combustion engine using the partial pressure of fresh air/fuel mixture component ps_fg and the partial pressure of exhaust gas component ps_ab. In particular, the invention includes a device which implements a method as described above. This device according to an exemplary embodiment of the invention offers all the advantages that have already been named above for the method according to an exemplary embodiment of the invention. In particular the device offers the advantage of low fuel consumption, an environmentally compatible operation of the internal combustion engine as well as high performance and a long life of the device and of the internal combustion engine.

An exemplary embodiment of the invention also includes a motor vehicle having a device as described above and/or a motor vehicle having a device which can implement a method as described above. The advantages named above for the device according to an exemplary embodiment of the invention also apply to the motor vehicle correspondingly.

An exemplary embodiment of the invention also includes a data medium containing a control program for implementing the above-described method as well as a data medium containing parameters which are necessary or advantageous for implementing such a method and/or for the control of a device described above. In particular, such a data medium may be designed in the form of a storage medium in which the storage can take place mechanically, optically, magnetically, electronically or by other means. Electronic storage media in particular, such as for example, ROM (Read Only Memory), PROM, EPROM or EEPROM, that may be used and/or inserted in corresponding control devices, may be used.

Additional advantages, features and details of the exemplary embodiments of the present inventions may be realized with respect to the following description, including the Figures, of the exemplary embodiments of the present inventions.

DETAILED DESCRIPTION

Figure 1:
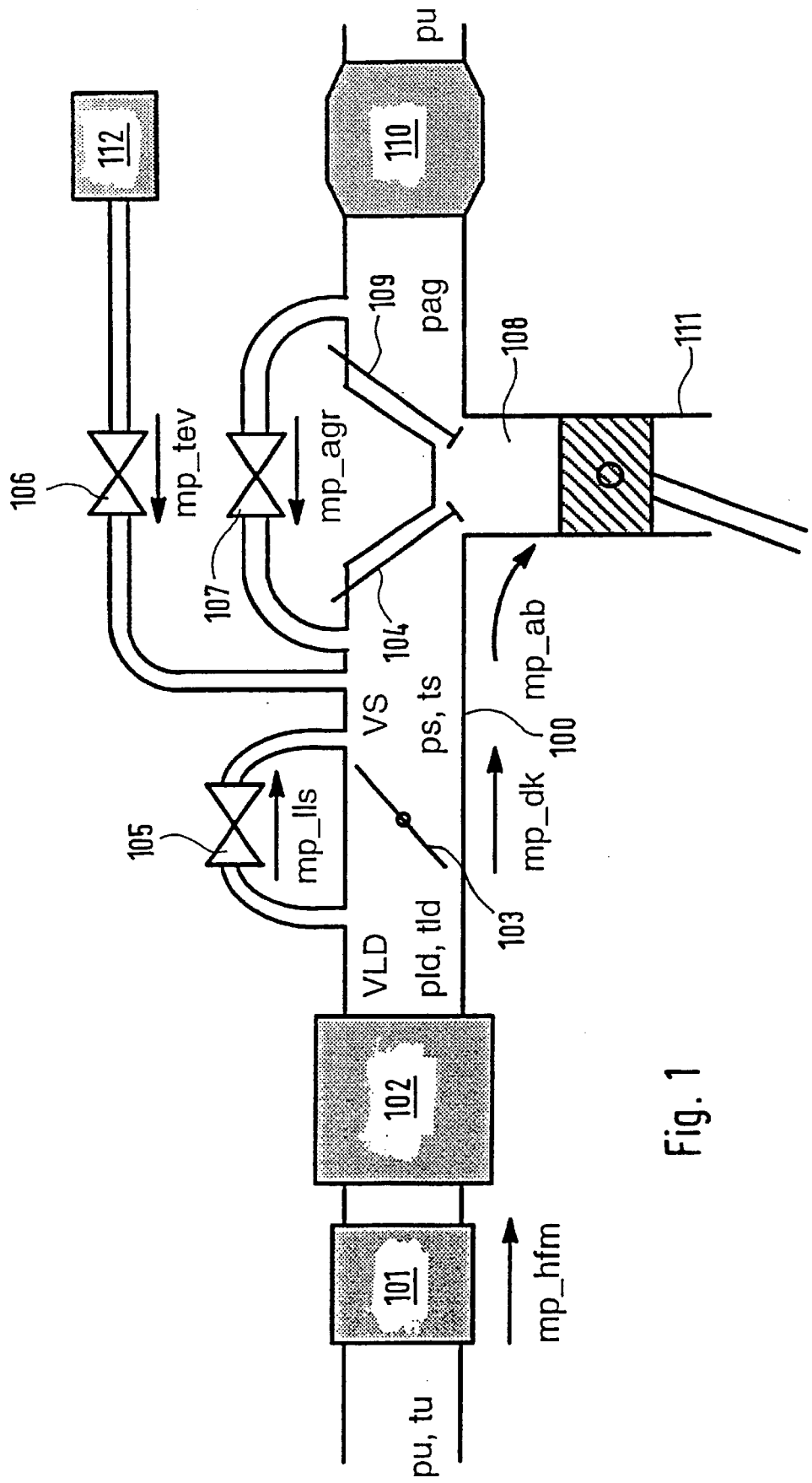
FIG. 1 shows an overview of the system.

FIG. 1 shows an overview of the system configuration. On the intake side, the ambient air enters intake manifold 100 at pressure pu and temperature tu. A hot film air-mass sensor 101 determines gas mass flow mp_hfm at this point of the intake manifold. A supercharger 102 is located downstream of the hot film air-mass sensor (HFM). Intake manifold 100 has a volume VLD between supercharger 102 and throttle valve 103. A pressure pld and a temperature tld are present in this volume. The volume of the intake manifold is VS between throttle valve 103 and intake valve 104. At this point, a pressure ps and a temperature ts are present. The gas volume flowing in the area of the intake manifold between throttle valve 103 and intake valve 104 is made up of gas flow mp_dk of the gas flow via throttle valve 103, a gas flow mp_lls of an idle actuator 105, gas flow mp_tev of a fuel-tank venting valve 106 as well as gas flow mp_agr of an exhaust gas recirculation valve 107. When intake valve 104 is opened, the gas flows from this area of the intake manifold into combustion chamber 108 of cylinder 111. On the exhaust side, an area is located between an exhaust valve 109 and a catalytic exhaust convertor 110 in which area exhaust gas recirculation valve 107 is connected and in which a pressure pag is present. Downstream of catalytic convertor 110, ambient pressure pu is again present. Fuel-tank venting valve 106 has a connection to fuel tank 112.

Figure 2:
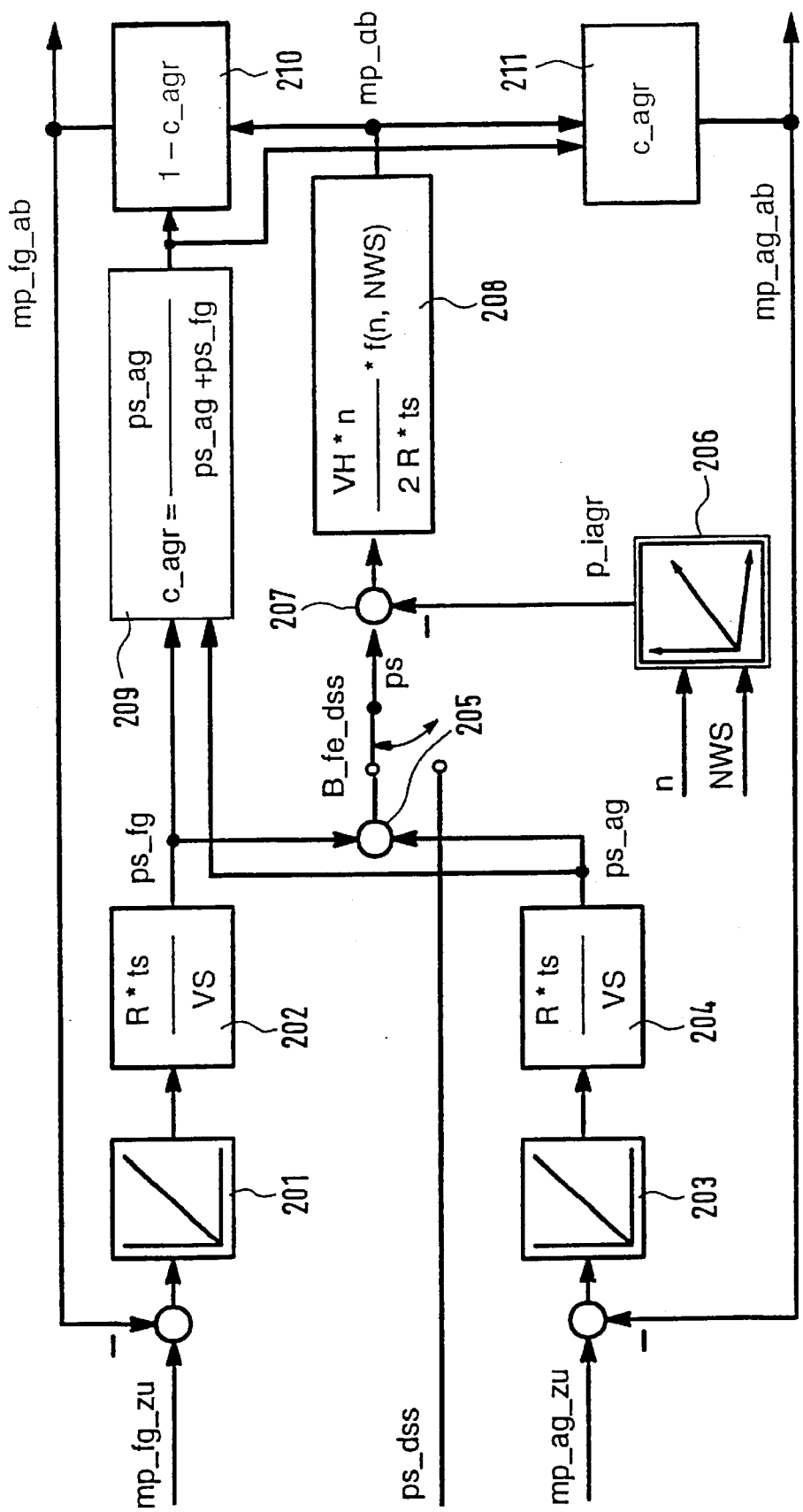
FIG. 2 shows a charge detection model.

FIG. 2 shows the model for charge detection. Inflowing fresh air/fuel mixture mass flow mp_fg_zu is integrated 201 over time and then multiplied 202 according to the gas equation, resulting in the calculation of fresh air/fuel mixture partial pressure ps_fg. Inflowing exhaust gas mass flow mp_ab_zu is integrated 203 accordingly and multiplied 204 according to the gas equation, resulting in the calculation of exhaust gas partial pressure ps_ab. Pressure in the intake manifold ps is calculated by addition 205 from the two partial pressures for fresh air/fuel mixture ps_fg and exhaust gas ps_ag in the shown position of switch B_fe_dss. At the same time, a correction value p_iagr is calculated 206 from speed n and camshaft adjustment NWS. This correction value takes into account the system-inherent exhaust gas recirculation based on the valve positions during the working cycle of the internal combustion engine. Correction value p_iagr obtained in this manner is subtracted 207 from intake manifold pressure ps. The effective intake manifold pressure resulting therefrom is then multiplied 208 by a factor, this factor being made up of the pump equation and an empirically obtained function which combines the pulsation effects as a function of speed n and camshaft adjustment NWS. The pump equation takes into account displacement volume VH, speed n, gas constant R and temperature in the intake manifold ts. Total mass flow mp_ab in the cylinder is obtained as the result of this multiplication 208. At the same time, a proportional factor c_agr is calculated 209 from the partial pressure of fresh air/fuel mixture ps_fg and the partial pressure of exhaust gas ps_ag. Using this proportional factor c_agr, outflowing fresh air/fuel mixture mass flow mp_fg_ab is calculated 210 and outflowing exhaust gas mass flow mp_ag_ab is calculated 211 from outflowing gas mass flow mp_ab.

In the event that intake manifold pressure ps is available by measurement, measured intake manifold pressure ps_dss may be used via condition B_fe_dss and the associated switches instead of the intake manifold pressure calculated from partial pressures ps_fg and ps_ag. Since in this case, the stationary stability of the integrator is not automatically assured due to the interrupted feedbacks, a supplementation is necessary, a difference resulting from a comparison of the calculated intake manifold pressure with the measured intake manifold pressure being interpreted as an error, this error being calculated in via an integral controller on the feedback branch of outflowing fresh air/fuel mixture mass flow mp_fg_ab.

The procedure for calculating the input variables necessary for the above function, namely fresh air/fuel mixture mass flow mp_fg_zu into the intake manifold as well as exhaust gas mass flow mp_ag_zu into the intake manifold, is based on the throttle function known from the literature which is derived from the Bernoulli equation for compressible media. According to this throttle function:

$$mp = f(A) \times \sqrt{\left(\frac{TV\_NORM}{tv} \times \frac{pv}{PV\_NORM} \times \text{psi\_n}(pn/pv)\right)}$$

$$mp = mp\_max \times ft \times fp \times \text{psi\_n}$$

This throttle function means that air mass flow mp via the throttle point is calculated from a free cross-sectional surface f(A), multiplied by a factor ft for the temperature compensation, multiplied by a factor fp for the pressure compensation and multiplied by a standardized flow function psi_n which takes into account the influence of a supercritical and subcritical flow speed. Pressure pn downstream of the throttle point is always equal to intake manifold pressure ps.

On the fresh air/fuel mixture side, a distinction must be made between naturally aspirated engines and supercharged engines. They have in common that a gas flow is determined via a characteristic curve for each throttle element, the gas flow flowing across the throttle in question under standard conditions in relation to pressure and temperature upstream of the throttle.

Figure 3:
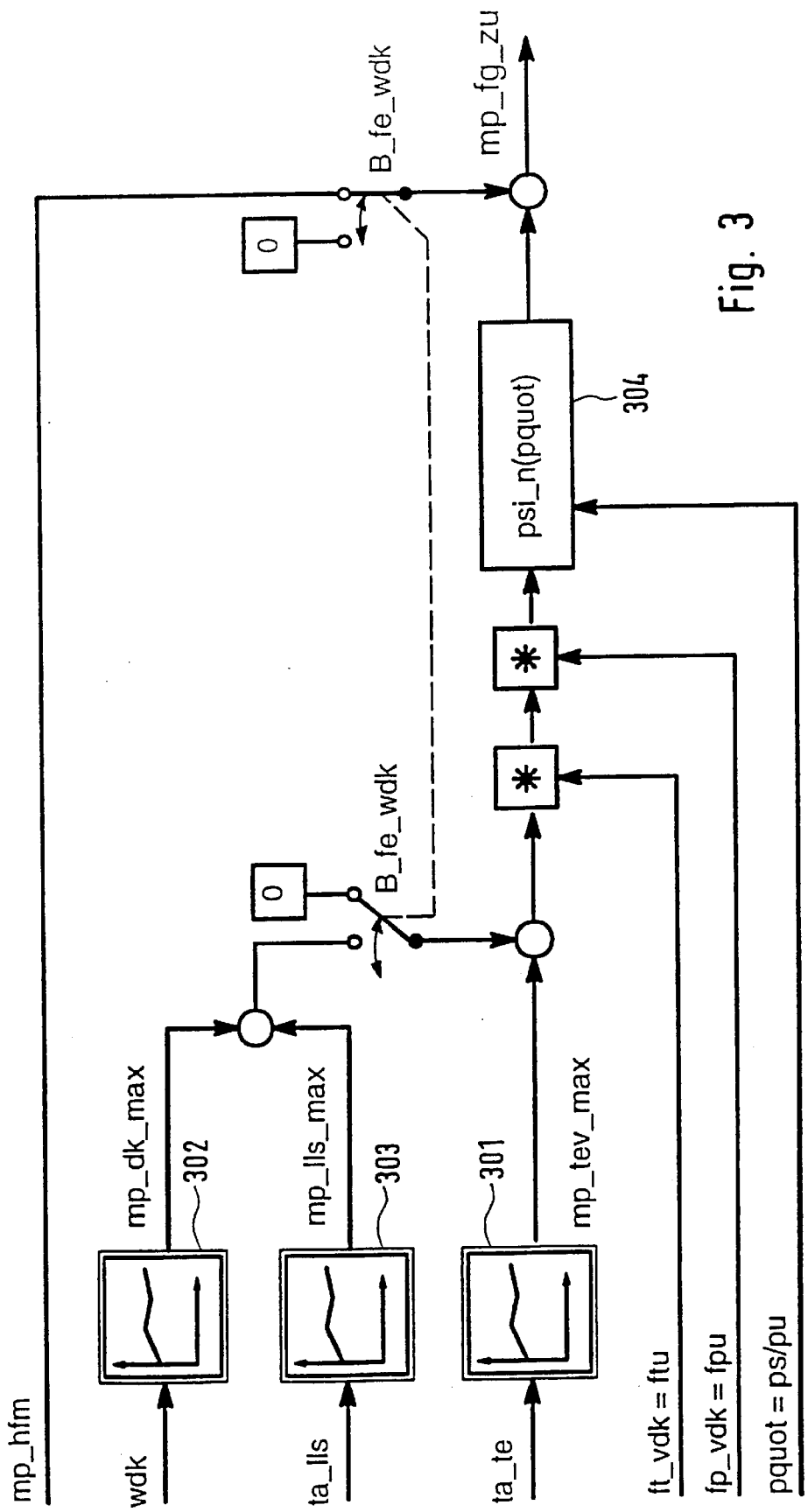
FIG. 3 shows the fresh air/fuel mixture mass flows into the intake manifold in a naturally aspirated engine.

FIG. 3 shows the fresh air/fuel mixture mass flows into the intake manifold of a naturally aspirated engine. There is first the possibility, according to switch position B_fe_wdk as shown in FIG. 3, that the inflowing fresh air/fuel mixture mass flow mp_fg_zu is measured directly mp_hfm via a hot film air-mass sensor HFM. In the switch position shown, only the tank ventilation ta_te still has an influence, this influence being converted via a throttle function 301 into a gas mass flow mp_tev_max and subsequently being weighted with the weighting factors of ambient temperature ftu, ambient pressure fpu and standardized flow function psi_n 304. If switch B_fe_wdk is thrown, inflowing fresh air/fuel mixture mass flow mp_fg_zu is calculated as follows: throttle valve position wdk is converted into a maximum flow across throttle valve mp_dk_max via a throttle function 302; similarly the flow across an idle actuator which may be present is converted into a maximum gas flow across idle actuator mp_lls_max via a throttle function 303. The two maximum gas flows are added and then added to the maximum gas flow via fuel-tank venting valve mp_tev_max. Subsequently, the gas mass flows thus totaled are weighted with the weighting factors of temperature ftu, pressure fpu and standardized flow function psi_n. These calculations finally result in an inflowing fresh air/fuel mixture mass flow mp_fg_zu.

Figure 4:
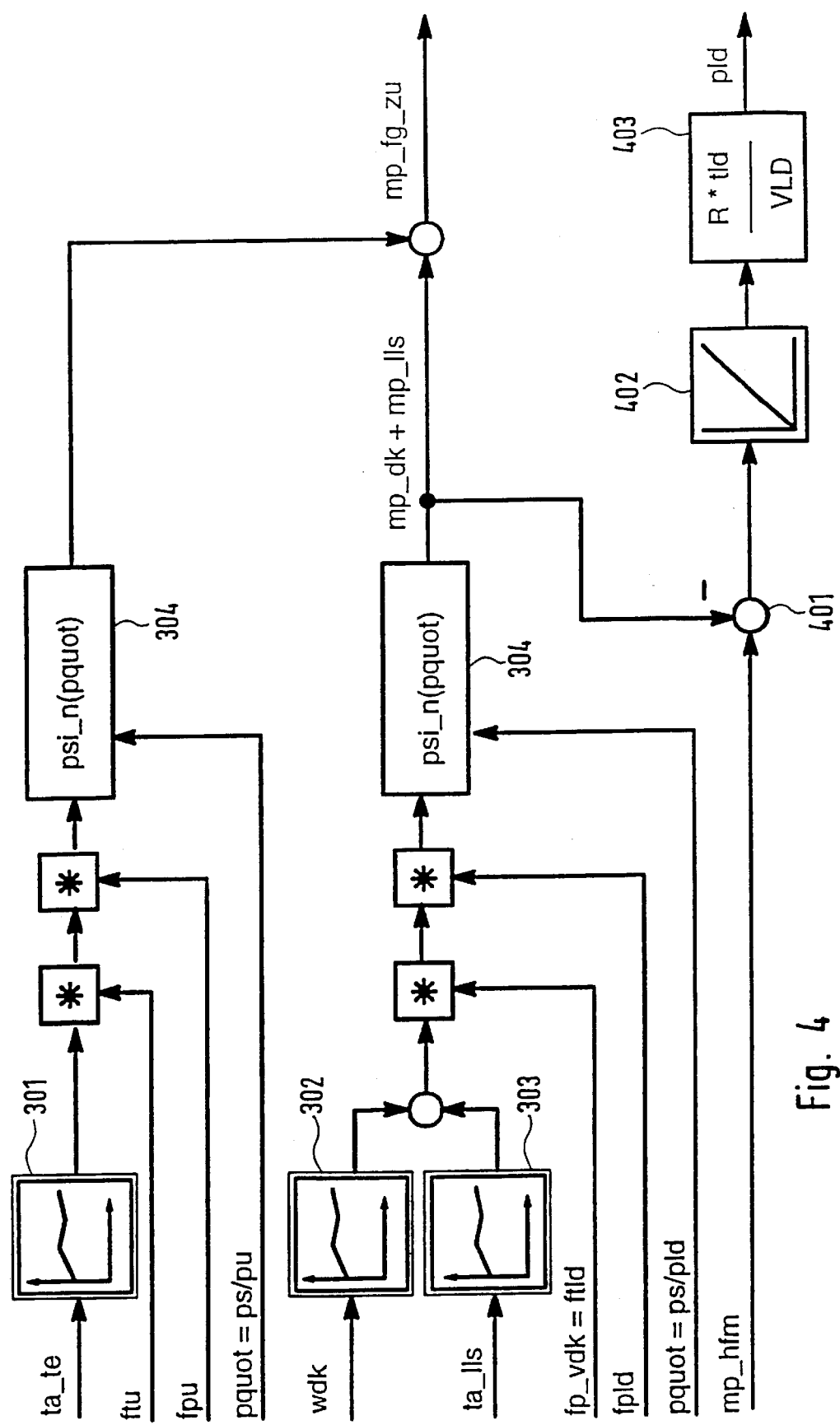
FIG. 4 shows the fresh air/fuel mixture mass flows in the intake manifold in a turbocharged engine.

FIG. 4 shows the fresh air/fuel mixture mass flows into the intake manifold of a turbocharged engine. In contrast to FIG. 3, the volume between the supercharger and the throttle valve with the state parameter charge-air pressure pld is an additional dynamic system in this case. For this volume also, it is possible to derive a differential equation for the pressure in volume, in this case the charge-air pressure, via a balance equation. The throttle function can also be applied again, now however taking the changed situation in relation to the pressure upstream of the throttle valve into account for which the charge-air pressure instead of the ambient pressure must be applied. As an additional significant difference, it is striking that charge-air pressure pld can be determined with the configuration according to FIG. 4 from calculated gas mass flow mp_dk+mp_lls and the signal of hot film air-mass sensor mp_hfm by corresponding subtraction 401 and downstream integration over time 402 and weighting according to gas equation 403. As an essential result, inflowing fresh air/fuel mixture mass flow mp_fg_zu is also available at the output in the configuration shown in FIG. 4 as an output signal for further processing.

Figure 5:
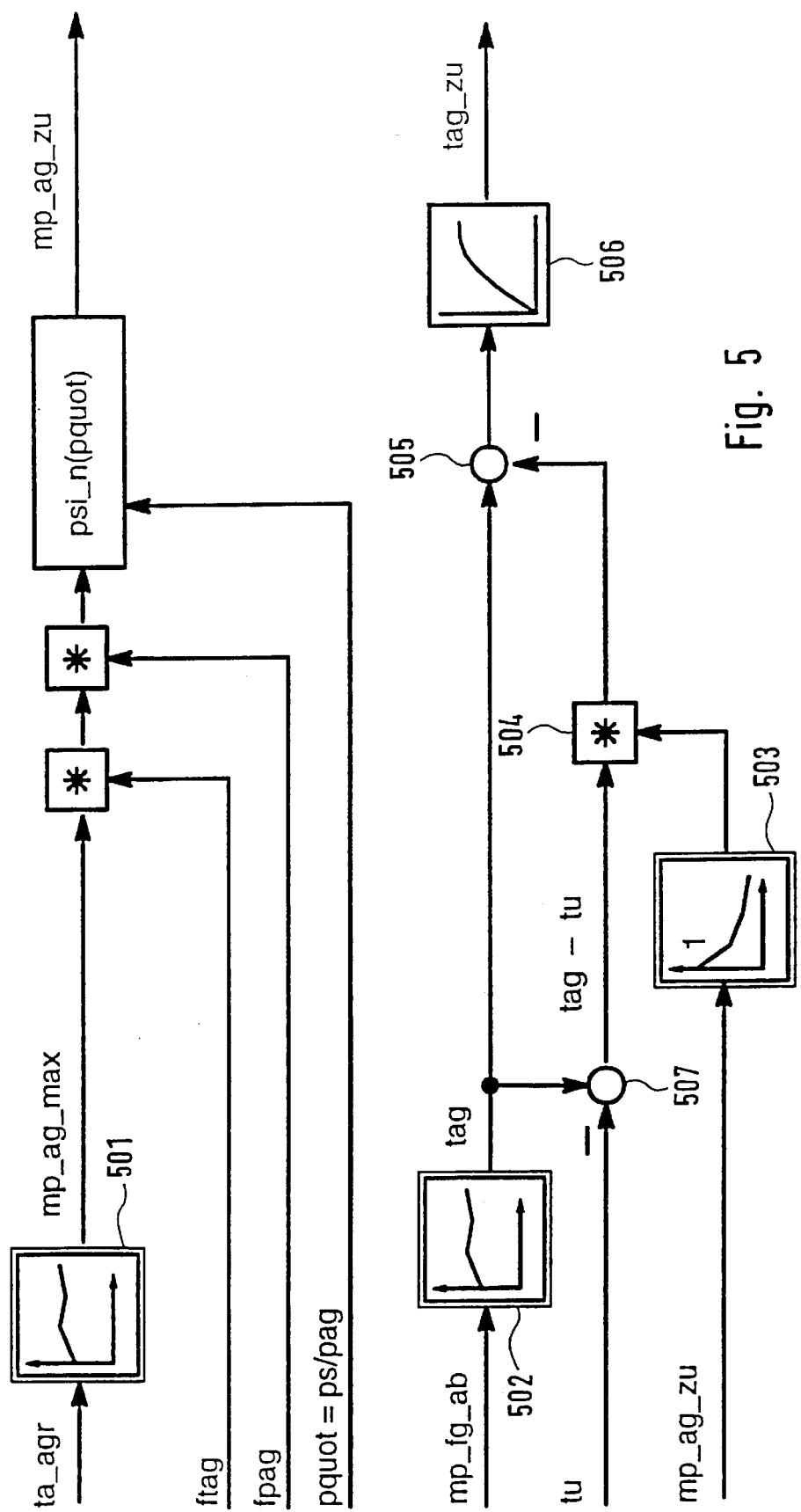
FIG. 5 shows the exhaust gas mass flow into the intake manifold.

FIG. 5 shows the exhaust gas mass flow into the intake manifold. Exhaust gas mass flow mp_ab_zu is converted from the signal of exhaust gas recirculation valve ta_agr via a throttle function 501 into a maximum mass flow via exhaust gas valve mp_ag_max and subsequently weighted for temperature ftag, pressure fpag and standardized flow function psi_n with the corresponding weighting factors. A simple model which takes into account the heat transmission on the wall of the connecting pipe to the intake manifold serves the purpose of determining the temperature of inflowing exhaust gas tag_zu. Temperature tag of the exhaust gas is initially determined via outflowing fresh air/fuel mixture mass flow mp_fg_ab via the throttle function 502. A subsequent subtraction 507 using ambient temperature tu results in a differential value tag−tu. This differential value is weighted 503 with inflowing exhaust gas mass flow mp_ab_zu evaluated with function 503 and then subtracted 504 from the temperature of exhaust gas tag. The value formed thereupon is then evaluated with a function 506, resulting in a temperature of the inflowing exhaust gas tag_zu.

Figure 6:
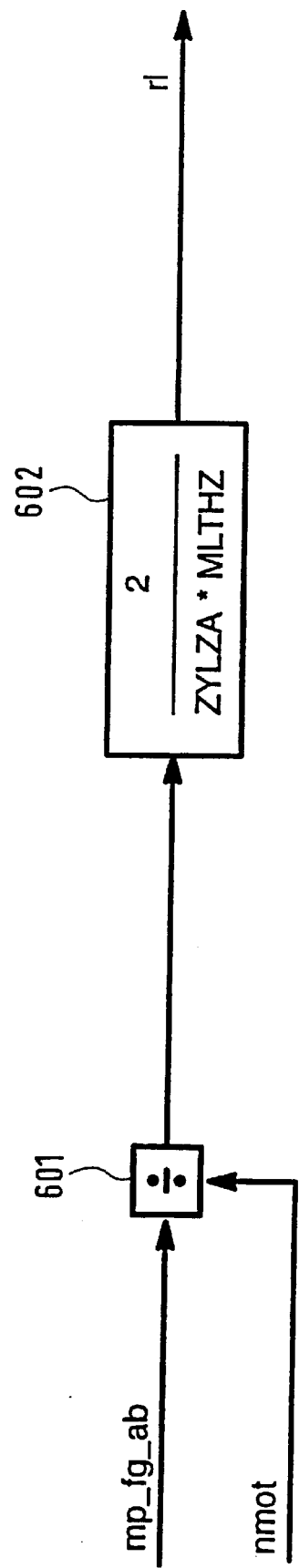
FIG. 6 shows the determination of the relative charge.

FIG. 6 shows the calculation of relative gas charge rl from outflowing fresh air/fuel mixture mass flow mp_fg_ab. Outflowing fresh air/fuel mixture mass flow mp_fg_ab is divided 601 by the engine speed nmot and then multiplied 602 by a factor, the factor taking into account air mass MLTHZ in one cylinder under standard conditions (T=273 degrees Kelvin, p=1013 mbar) as well as the number of active cylinders ZYLZA of the engine. Relative charge rl of a cylinder with a fresh air/fuel mixture gas mass results from this calculation.

Abbreviations

| | |
|---|---|
| B_fe_wdk | Switch, switch signal |
| c_agr | Proportional factor fresh air/fuel mixture/exhaust gas |
| f (A) | free cross-sectional surface of a throttle point |
| fp | Pressure compensation factor |
| fpag | Exhaust gas weighting factor |
| fpu | Ambient pressure weighting factor |
| fpld | Supercharger pressure weighting factor |
| ft | Temperature compensation factor |
| ftag | Exhaust gas temperature weighting factor |
| ftu | Ambient temperature weighting factor |
| ftld | Supercharger temperature weighting factor |
| K | Calculation constant |
| m | (Molecular) mass of the gas |
| m_ag | Mass, exhaust gas |
| m_fg | Mass, fresh air/fuel mixture |
| mp | Air mass flow via a throttle point |
| mp_ab | Gas mass flow flowing out of the intake manifold |
| mp_ag | Exhaust gas mass flow |
| mp_ag_ab | Outflowing exhaust gas mass flow |
| mp_ag_max | Maximum inflowing exhaust gas mass flow |
| mp_ag_zu | Inflowing exhaust gas mass flow |
| mp_agr | Gas flow via an exhaust gas recirculation valve |
| mp_dk_max | Maximum flow via the throttle valve |
| mp_fg | Fresh air/fuel mixture mass flow |
| mp_fg_ab | Outflowing fresh air/fuel mixture mass flow |
| mp_fg_zu | Inflowing fresh air/fuel mixture mass flow |
| mp_hfm | Air mass flow, measured by hot film sensor |
| mp_lls | Gas flow via an idle actuator |
| mp_lls_max | Maximum gas flow via an idle actuator |
| mp_max | Maximum air mass flow via a throttle point |
| mp_tev | Gas flow via a fuel-tank venting valve |
| mp_tev_max | Maximum gas flow via a fuel-tank venting valve |
| MLTHZ | Air mass in one cylinder under standard conditions |
| n, nmot | Speed |
| NWS | Camshaft adjustment |
| p | Pressure |
| p_iagr | Correction value of the internal exhaust gas recirculation |
| pld | Charge-air pressure |
| pn | Pressure downstream of the throttle point |
| ps | Pressure in the intake manifold |
| ps_ab | Exhaust gas partial pressure |
| ps_fg | Fresh air/fuel mixture partial pressure |
| psi_n | Standardized flow function (0 < psi_n < 1) |
| pv | Pressure upstream of the throttle point |
| PV_NORM | Reference value |
| rl | Relative charge |
| R | Gas constant |
| tld | Supercharger temperature |
| T | Temperature |
| TS, ts | Temperature of intake manifold |
| tv | Temperature upstream of the throttle valve |
| TV_NORM | Reference value |
| V | Volume |
| VH | Displacement volume |
| VLD | Supercharger volume |
| VS | Intake manifold volume |

-continued

| | |
|---|---|
| wdk | Throttle valve position |
| ZYLZA | Number of active cylinders |

What is claimed is:

1. A method for determining a gas charge of an internal combustion engine having an intake manifold in which an exhaust gas and a gas mixture that is a fresh air/fuel mixture are present, a gas mass flow flowing from the intake manifold and an intake manifold pressure being present in the intake manifold, the method comprising the steps of:

determining a partial pressure of the fresh air/fuel mixture in the gas mass flow by setting up a mass balance for a fresh air/fuel mixture mass flow;

determining a partial pressure of the exhaust gas in the gas mass flow by setting up a mass balance for an exhaust gas mass flow; and determining the gas mass flow via a throttle by using a function derived from a Bernoulli equation and being dependent on a temperature compensation factor, a pressure compensation factor, and a factor depending on a ratio of a pressure downstream of the throttle to a pressure upstream of the throttle, the pressure downstream of the throttle corresponding to the intake manifold pressure.

2. The method of claim 1, further comprising the step of determining a fresh air/fuel mixture component flowing in via a throttle valve based on a ratio of the intake manifold pressure to an ambient pressure.

3. The method of claim 1, further comprising the step of determining an exhaust gas component flowing in via an exhaust gas recirculation valve based on a ratio of the intake manifold pressure to an exhaust gas pressure.

4. The method of claim 1, further comprising the step of determining the gas charge of the internal combustion engine based on a gas flow via a fuel-tank venting valve.

5. The method of claim 1, further comprising the step of determining the gas charge of a supercharged internal combustion engine based on a charge-air pressure.

6. A device for determining a gas charge of an internal combustion engine having an intake manifold, the apparatus comprising:

a sensor arrangement; and an electronic computation arrangement that determines a partial pressure of a fresh air/fuel mixture in the intake manifold by setting up a mass balance for a fresh air/fuel mixture mass flow, that determines a partial pressure of an exhaust gas component in the intake manifold by setting up a mass balance for an exhaust gas mass flow, and that determines a gas mass flow via a throttle based on a function derived from a Bernoulli equation and being dependent on a temperature compensation factor, a pressure compensation factor, and a factor depending on a ratio of a pressure downstream of the throttle to a pressure upstream of the throttle, the pressure downstream of the throttle corresponding to an intake manifold pressure.

7. The device of claim 6, wherein the electronic computation arrangement determines a fresh air/fuel mixture component flowing in via a throttle valve based on a ratio of the intake manifold pressure to an ambient pressure.

8. The device of claim 6, wherein the electronic computation arrangement determines an exhaust gas component flowing in via an exhaust gas recirculation valve based on a ratio of the intake manifold pressure to an exhaust gas pressure.

9. The device of claim 6, wherein the electronic computation arrangement determines the gas charge of the internal combustion engine based on a gas flow via a fuel-tank venting valve.

10. The device of claim 6, wherein the electronic computation arrangement determines the gas charge of a supercharged internal combustion engine based on a charge-air pressure.

11. A data medium for use with a control program for performing a method that includes the steps of:

determining a partial pressure of a fresh air/fuel mixture in a gas mass flow by setting up a mass balance for a fresh air/fuel mixture mass flow;

determining a partial pressure of an exhaust gas in the gas mass flow by setting up a mass balance for an exhaust gas mass flow; and determining a gas mass flow via a throttle based on a function derived from a Bernoulli equation and being dependent on a temperature compensation factor, a pressure compensation factor, and a factor depending on a ratio of a pressure downstream of the throttle to a pressure upstream of the throttle, the pressure downstream of the throttle corresponding to an intake manifold pressure.

\* \* \* \* \*